United States Patent
Luk et al.

(10) Patent No.: US 12,526,376 B2
(45) Date of Patent: Jan. 13, 2026

(54) SENSOR INTERRUPT HANDLING

(71) Applicant: QUALCOMM Incorporated, San Diego, CA (US)

(72) Inventors: King Wayne Luk, San Diego, CA (US); Rohan Desai, San Diego, CA (US); Rajakumar Govindaram, San Diego, CA (US); Srinath Shenvi Buyaon, San Diego, CA (US); Naresh Andugulapathi, San Diego, CA (US); Satish Goverdhan, San Diego, CA (US); Jeyaprakash Soundrapandian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 18/313,065

(22) Filed: May 5, 2023

(65) Prior Publication Data

US 2024/0372956 A1 Nov. 7, 2024

(51) Int. Cl.
*H04N 1/21* (2006.01)
*H04N 23/60* (2023.01)
(Continued)

(52) U.S. Cl.
CPC ......... *H04N 1/2137* (2013.01); *H04N 23/617* (2023.01); *H04N 23/665* (2023.01); *H04N 2101/00* (2013.01)

(58) Field of Classification Search
CPC .. H04N 1/2137; H04N 23/617; H04N 23/665; H04N 2101/00
See application file for complete search history.

(56) References Cited

U.S. PATENT DOCUMENTS

| | | | |
|---|---|---|---|
| 6,499,078 B1 | 12/2002 | Beckert et al. | |
| 8,898,361 B2* | 11/2014 | Sarkar | G06F 13/26 710/265 |
| 2013/0339563 A1* | 12/2013 | Sarkar | G06F 13/26 710/265 |

FOREIGN PATENT DOCUMENTS

EP 1031925 B1 4/2009

OTHER PUBLICATIONS

International Search Report and Written Opinion—PCT/US2024/026639—ISA/EPO—Aug. 21, 2024.

* cited by examiner

*Primary Examiner* — Lin Ye
*Assistant Examiner* — Fayez A Bhuiyan
(74) *Attorney, Agent, or Firm* — QUALCOMM Incorporated

(57) ABSTRACT

Techniques are described for interrupt handling. A device can obtain, at a first context buffer associated with a first interrupt handler, first processing configuration data associated with a first sensor; obtain, at a second context buffer associated with a second interrupt handler, second processing configuration data associated with a second sensor; obtain, at the first interrupt handler, an error indication associated with the first sensor; perform, by the first interrupt handler, based on the error indication, an error handling operation (where the error handling operation comprises flushing the first context buffer and/or invalidating the first processing configuration data in the first context buffer); obtain, at the second interrupt handler, during a time window interval between obtaining the error indication and a completion time of the error handling operation, from the second sensor, an interrupt request (IRQ); and output, based on the IRQ, the second processing configuration data to a processor.

24 Claims, 9 Drawing Sheets

(51) Int. Cl.
*H04N 23/617* (2023.01)
*H04N 101/00* (2006.01)

SENSOR INTERRUPT HANDLING

FIELD

Aspects of the present disclosure are related to systems and techniques for performing sensor interrupt handling.

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A vehicle is an example of a device that can include multiple cameras. For instance, a vehicle can include one or more cameras that can capture images of the exterior of the vehicle. The images can be processed for various purposes, such as identifying other vehicles, objects, and/or obstacles in proximity to the vehicle, among others.

BRIEF SUMMARY

In some examples, systems and techniques are described for interrupt handling. According to at least one illustrative example, a method of interrupt handling is provided. The method includes: obtaining, at a first context buffer associated with a first interrupt handler, first image processing configuration data associated with a first image sensor; obtaining, at a second context buffer associated with a second interrupt handler, second image processing configuration data associated with a second image sensor, different from the first image sensor; obtaining, at the first interrupt handler, an error indication associated with the first image sensor; performing, by the first interrupt handler, based on the error indication associated with the first image sensor, an error handling operation, wherein the error handling operation comprises at least one of flushing the first context buffer or invalidating the first image processing configuration data in the first context buffer; obtaining, at the second interrupt handler, during a time window interval between obtaining the error indication associated with the first image sensor and a completion time of the error handling operation, from the second image sensor, an interrupt request (IRQ); and outputting, based on obtaining the IRQ, the second image processing configuration data to an image processor.

In another illustrative example, an apparatus for interrupt handling, the apparatus comprising: a first interrupt handler configured to obtain an error indication associated with a first image sensor; a first context buffer associated with the first interrupt handler and configured to obtain first image processing configuration data associated with the first image sensor; a second interrupt handler; and a second context buffer associated with the second interrupt handler and configured to obtain second image processing configuration data associated with a second image sensor, different from the first image sensor; wherein the first interrupt handler is further configured to perform, based on the error indication associated with the first image sensor, an error handling operation, wherein the error handling operation comprises at least one of flushing the first context buffer or invalidating the first image processing configuration data in the first context buffer; and wherein the second interrupt handler is configured to obtain, during a time window interval between obtaining the error indication associated with the first image sensor and a completion time of the error handling operation, from the second image sensor, an interrupt request (IRQ); and wherein the second context buffer is configured to output, based on obtaining the IRQ, the second image processing configuration data to an image processor In some aspects, one or more of the apparatuses described above is, is part of, or includes a vehicle (e.g., a vehicle computing system of a vehicle), a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Increasingly, systems and devices (e.g., autonomous vehicles, such as autonomous and semi-autonomous cars, drones, mobile robots, mobile devices, extended reality (XR) devices, and other suitable systems or devices) include multiple sensors to gather information about the environment, as well as processing systems to process the information gathered, such as for route planning, navigation, collision avoidance, etc. One example of such a system is an Advanced Driver Assistance System (ADAS) for a vehicle. Sensor data, such as images captured from one or more cameras, may be processed and/or analyzed to perform one or more functions, such as to detect objects (e.g., targets).

In some cases, a processing system (e.g., a vehicle computing system 250) may be used to configure sensors, coordinate sensor data capture, and/or coordinate sensor data processing. In some implementations, the multiple sensors can generate interrupt requests (IRQ) as a signaling to communicate with the processing system. In some cases, an interrupt handler can coordinate sensor data processing. For example, the interrupt handler can coordinate sensor data processing based on IRQs generated by the multiple sensors.

Figure 1A:
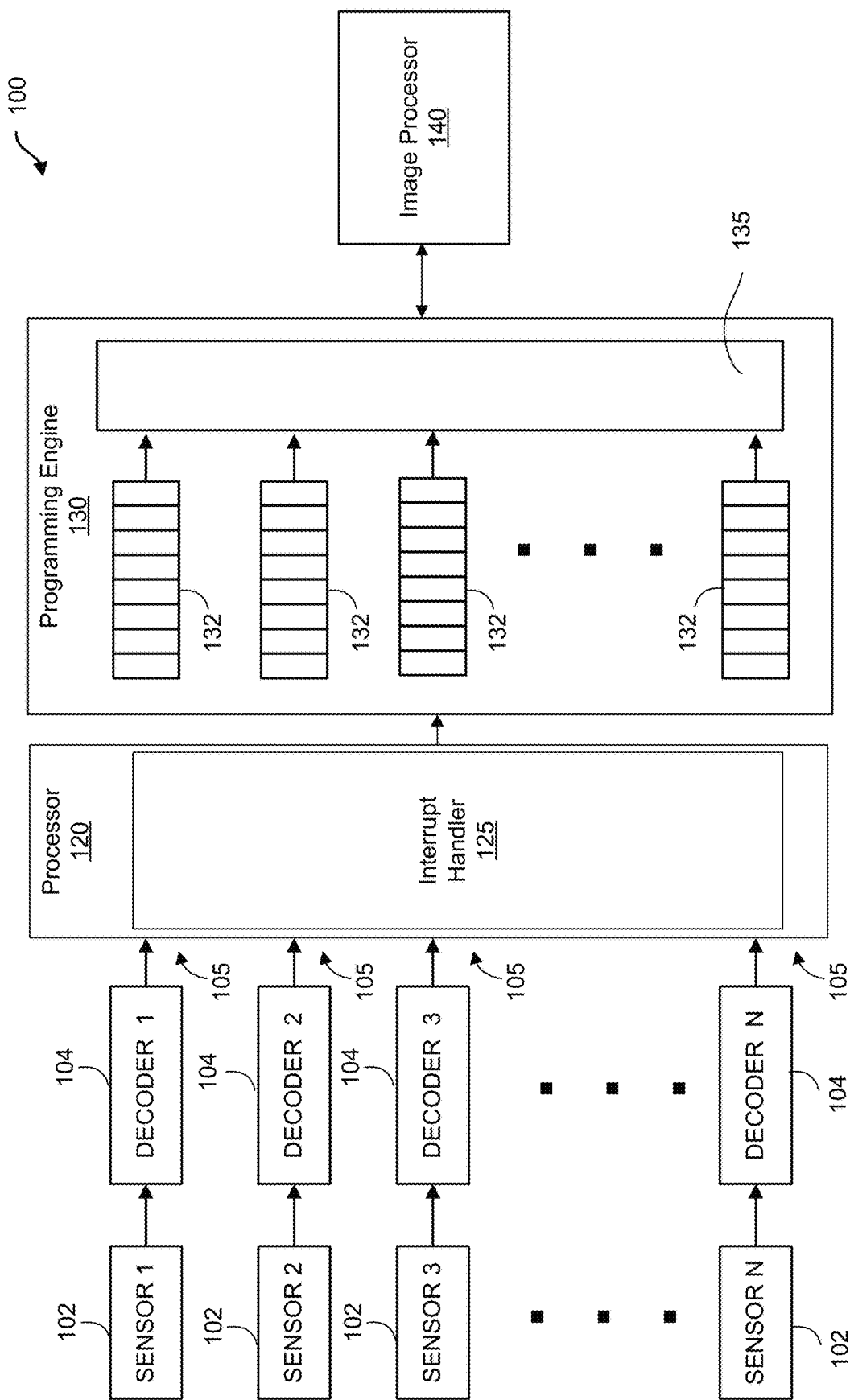
FIG. 1A and FIG. 1B are block diagrams illustrating example multiple sensor camera configurations, in accordance with some examples of the present disclosure.

FIG. 1A illustrates an example multiple sensor camera configuration 100 including a software (SW) interrupt handler. As illustrated in FIG. 1A, the multiple sensor camera configuration 100 includes multiple sensors 102, multiple decoders 104, a processor 120, a programming engine 130, and an image processor 140.

In some cases, the sensors 102 can include one or more image sensors. In some examples, the image sensors 102 can include one or more arrays of photodiodes or other photosensitive elements. In the example of FIG. 1A, each image sensor 102 outputs data to a corresponding decoder 104. Each photodiode measures an amount of light that eventually corresponds to a particular pixel in the image produced by the image sensors 102. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

In some examples, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensors 102) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, image sensors 102 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensors 102 may also include an analog gain amplifier to amplify the analog signals output by the photodiodes and/or an analog to digital converter (ADC) to convert the analog signals output of the photodiodes (and/or amplified by the analog gain amplifier) into digital signals. The image sensors 102 may include a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

In the illustrated example of FIG. 1A, each image sensor 102 is coupled to a decoder 104. In some cases, the decoder can be used to decode a serialized and/or encoded data stream from each image sensor 102. In one illustrative example, the image sensors 102 and decoders 104 can communicate by a Mobile Industry Processor Interface (MIPI) port or interface such as a MIPI CSI-2 physical (PHY) layer port or interface. In some cases, the decoder can generate interrupt requests (IRQs) 105 indicative of the completion of a sensor data capture operation (e.g., the end of an image frame). In some cases, the decoders 104 can each be connected to an IRQ port of the processor 120.

Figure 8:
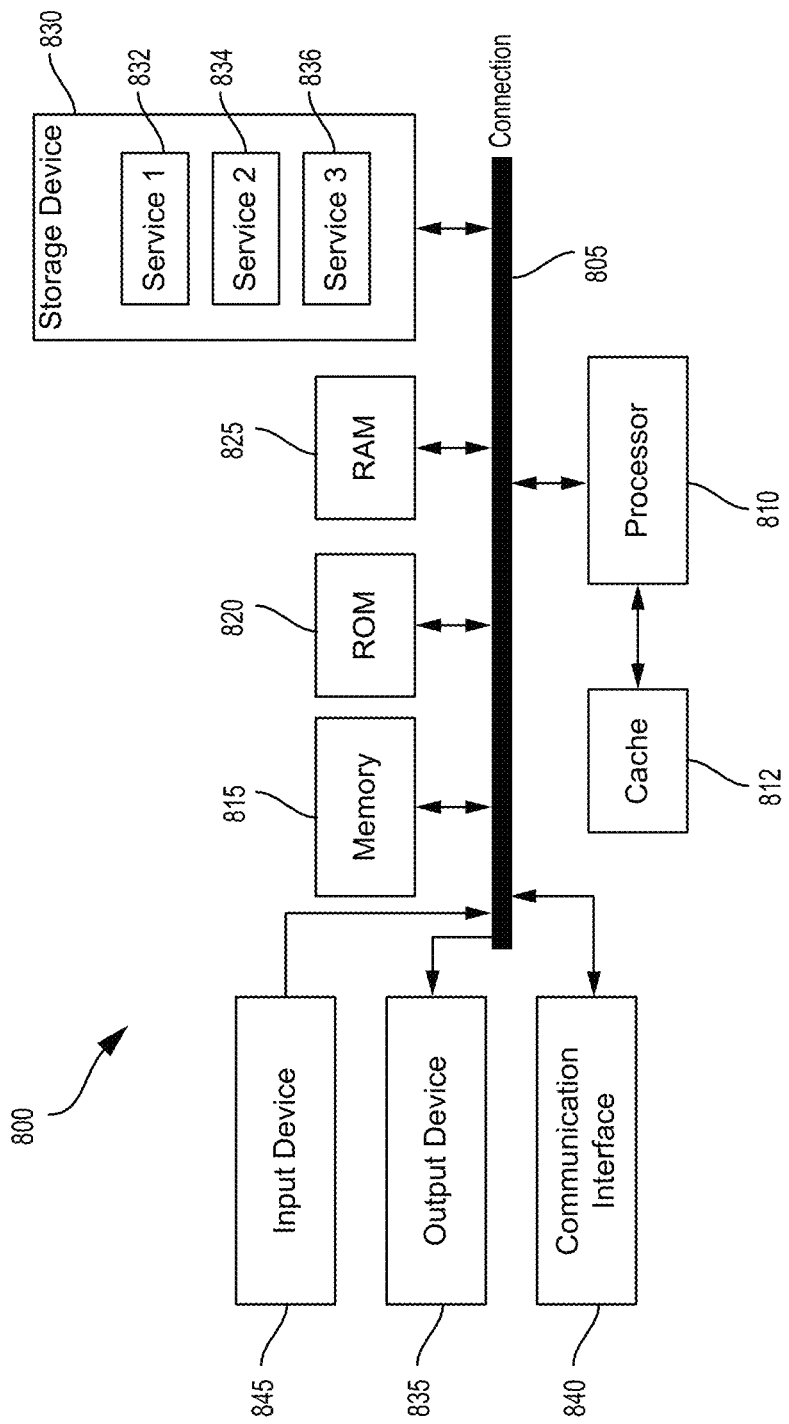
FIG. 8 is a diagram illustrating an example of a computing system for implementing certain aspects described herein, in accordance with some examples of the present disclosure.

The processor 120 may include one or more processors, such as one or more image signal processors (ISPs) (including image processor 140), one or more host processors (not shown), and/or one or more of any other type of processor 810 discussed with respect to the computing system 800 of FIG. 8. The processor 120 can include one or more digital signal processors (DSPs) central processing units (CPUs), graphics processing units (GPUs), and/or other type of processor.

In some implementations, the processor 120 is a single integrated circuit or chip (e.g., referred to as a system-on-chip or SoC) that includes image processor 140. In some cases, the chip can also include one or more input/output ports, central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. In some implementations, the I/O ports can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, MIPI (such as a MIPI CSI-2 PHY layer port or interface, an Advanced High-performance Bus (AHB) bus, any combination thereof, and/or other input/output port.

In some examples, the processor 120 can include an interrupt handler 125. In some examples, the interrupt handler 125 can respond to individual interrupts generated by the decoders 104. For example, upon receiving an IRQ 105 from a sensor 102, the processor 120 can signal the programming engine 130 that an image from the sensor 102 is ready for processing. In some cases, processor 120 can provide camera configuration data for the sensor 102. In some cases, camera configuration data can include, without limitation, ISO, exposure time, aperture size, f/stop, shutter speed, focus, and/or gain. In some examples, the processor 120 can provide corresponding image processing configuration data to a context buffer 132 of the programming engine 130 associated with the sensor 102. For example, the image processing configuration data can include, without limitation, ISO, exposure time, aperture size, f/stop, shutter speed, focus, gain, and/or adjustments to contrast, brightness, saturation, sharpness, levels, curves, and/or colors.

In some cases, the processor 120 and/or interrupt handler 125 may detect that an error has occurred with one or more of the sensors 102. For example, the processor may expect to receive an IRQ 105 associated with a particular sensor 102 at a specific timeframe based on the provided camera configuration data. In some cases, if the IRQ 105 does not arrive within the expected timeframe, the particular sensor 102 may be considered as exhibiting an error. In some cases, the interrupt handler 125 can perform one or more error handling operations to restore operation of the sensor exhibiting the error. For example, in some cases, the interrupt handler 125 can instruct the programming engine 130 to flush and/or invalidate data in the context buffer 132 corresponding to the sensor exhibiting the error. In some cases, the sensor 102 exhibiting the error can be reset and/or reprogrammed. In some implementations, the remaining sensors 102 can continue to operate while one or more error handling operations are completed for the sensor 102 exhibiting the error.

Programming engine 130 can be coupled to the context buffers 132, which can obtain and store image processing configuration data associated with each sensor 102 until the image processor 140 is available to process the image corresponding to the image processing configuration data. In one illustrative example, the context buffers 132 can be implemented as first-in-first out (FIFO) buffers. Each of the context buffers 132 can feed into a programming module 135 of the programming engine 130. In some cases, the programming module 135 can communicate with the image processor 140. For example, when the image processor 140 is available (e.g., not currently processing an image), the image processor can indicate that it is ready to process an image. In some cases, the programming module 135 can determine which of the context buffers 132 includes image processing configuration data for the next image to be processed by the image processor 140 and can pass the image processing configuration data to the image processor 140. In some cases, the programming module 135 can sequentially select each context buffer 132 in a round-robin fashion. In some cases, a priority scheme can be used to prioritize images from one or more high priority sensors. For example, images captured by sensors that may be analyzed by a computer vision system (e.g., a machine learning model) of a vehicle may be more time critical than an image that is used for display to a driver of the vehicle.

In some cases, the processor 120 can be a general purpose processor (e.g., a CPU) that also performs many other computing operations in addition to the operation of interrupt handler 125. For example, the processor 120 can be used to perform one or more operations of the vehicle computing system 250 of FIG. 2. In some cases, as the number of sensors 102 increases, the use of the general purpose processor 120 to handle the corresponding IRQs 105 may interfere with operation of functions that depend on the data (e.g., images) from sensors 102 and/or other functionality provided by the processor 120.

Figure 1B:
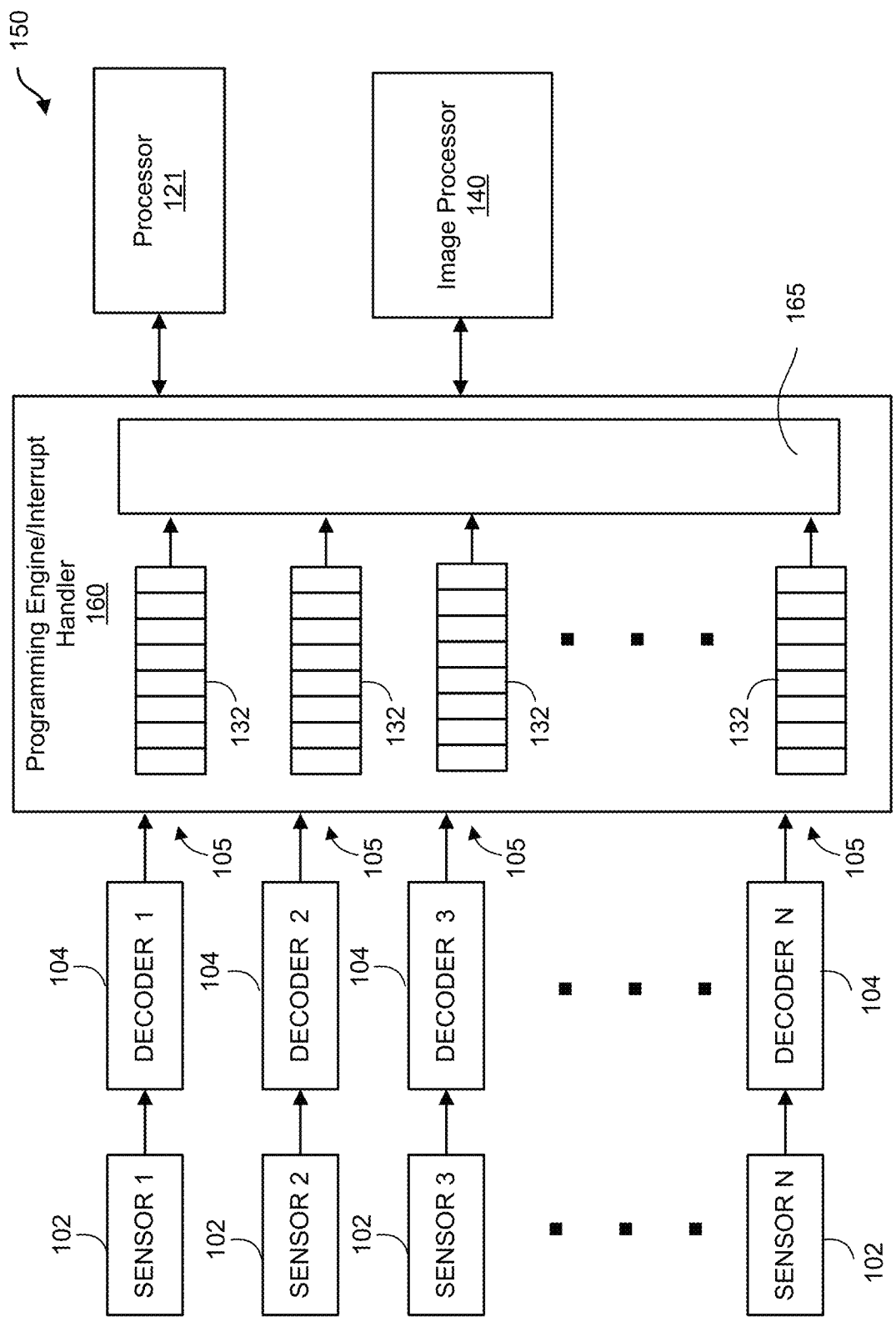

In some cases, a dedicated hardware component e.g., a hardware interrupt handler can be provided to offload the interrupt handling from a general purpose processor 120. FIG. 1B illustrates an example multiple sensor camera configuration 150 incorporating a hardware (HW) interrupt handler. In the illustrated example of FIG. 1B, the interrupt handler can be incorporated in the programming engine/interrupt handler 160. As illustrated, the functionality provided by interrupt handler 125 of FIG. 1A can instead be moved to the programming engine/interrupt handler 160 of FIG. 1B. For example, the decoders 104 can provide IRQs 105 to the programming engine/interrupt handler 160.

In some cases, processor 121 can provide camera configuration data for the sensors 102. In some cases, camera configuration data can include, without limitation, ISO, exposure time, aperture size, f/stop, shutter speed, focus, and/or gain. In some examples, the processor 121 can provide corresponding image processing configuration data to a context buffer 132 of the programming engine/interrupt handler 160 associated with the sensor 102. For example, the image processing configuration data can include, without limitation, ISO, exposure time, aperture size, f/stop, shutter speed, focus, gain, and/or adjustments to contrast, brightness, saturation, sharpness, levels, curves, and/or colors.

In some examples, the programming/interrupt engine 165 can respond to individual interrupts generated by the decoders 104. For example, upon receiving an IRQ 105 from a sensor 102, the programming/interrupt engine 165 can signal the programming/interrupt engine 165 that an image from the sensor 102 is ready for processing.

In some cases, the programming/interrupt engine 165 may detect that an error has occurred with one or more of the sensors 102. For example, the programming/interrupt engine 165 may expect to receive an IRQ 105 associated with a particular sensor 102 at a specific timeframe. In some cases, if the IRQ 105 does not arrive within the expected timeframe, the particular sensor 102 may be considered as exhibiting an error. In some cases, the programming/interrupt engine 165 can perform one or more error handling operations to restore operation of the sensor 102 exhibiting the error. For example, in some cases, the programming/interrupt engine 165 can flush and/or invalidate data in the context buffer 132 corresponding to the sensor exhibiting the error. In some cases, the sensor 102 exhibiting the error can be reset and/or reprogrammed. In the implementation of FIG. 1B, the remaining sensors 102 may not be able to continue operating while the error handling operation is completed. For example, if the programming/interrupt engine 165 is configured to provide image processing configuration data from the context buffers 132 in a round-robin fashion, the image processing operations of the remaining sensors may be blocked until the sensor exhibiting the error condition resumes normal functionality. As a result, the configuration illustrated in FIG. 1B may be unable to provide freedom from interference between the sensors 102. In some cases, interference between sensors 102 due to a sensor error can pose safety risks. In one illustrative example, if one image sensor 102 of an autonomous driving system including the multiple sensor camera configuration 150 of FIG. 1B exhibits an error, the autonomous driving system may be rendered unable to perform autonomous driving functions as a result of a single point failure of the sensors 102.

Systems and techniques are needed for interrupt handling for sensor systems including a large number of sensors (e.g., image sensors). For example, images from one or more sensors can be processed to provide safety features for a vehicle. In some cases, an inability to quickly respond to incoming sensor data can result in inaccurate and/or unsafe maneuvers by a vehicle. For example, software based interrupt handlers may be slow to respond and/or experience reduced performance as the number of sensors scales. In some cases, failure of an individual sensor (e.g., sensors 102) can result in a reset of multiple sensors, even those that are not experience failure. In some cases, independent operation of the multiple sensors 102 that follows a freedom from interference principle may be preferred.

Systems, apparatuses, processes (also referred to as methods), and computer-readable media (collectively referred to as "systems and techniques") are described herein for interrupt handling for sensor systems (e.g., sensor systems including a large number of sensors, such as image sensors). For example, a hardware based interrupt handler can receive interrupts from the multiple sensors 102. In some cases, offloading the interrupt handling from a processor (e.g., a CPU) to a dedicated hardware component can free up computing resources. In some aspects, offloading the interrupt handling to the dedicated hardware component can also provide reduced latency. In some examples, the systems and techniques described herein can further provide freedom from interference between the sensors (e.g., sensors 102). For example, each sensor of the multiple sensors can be associated with a context buffer of the interrupt handler. In some cases, if an error occurs for one of the sensors, the interrupt handler can perform error handling for the specific sensor exhibiting the error while continuing to perform interrupt handling for the properly functioning sensors of the multiple sensors. Accordingly, the systems and techniques described herein can be used to scalably provide interrupt handling for sensor systems including a large number of sensors.

Figure 2:
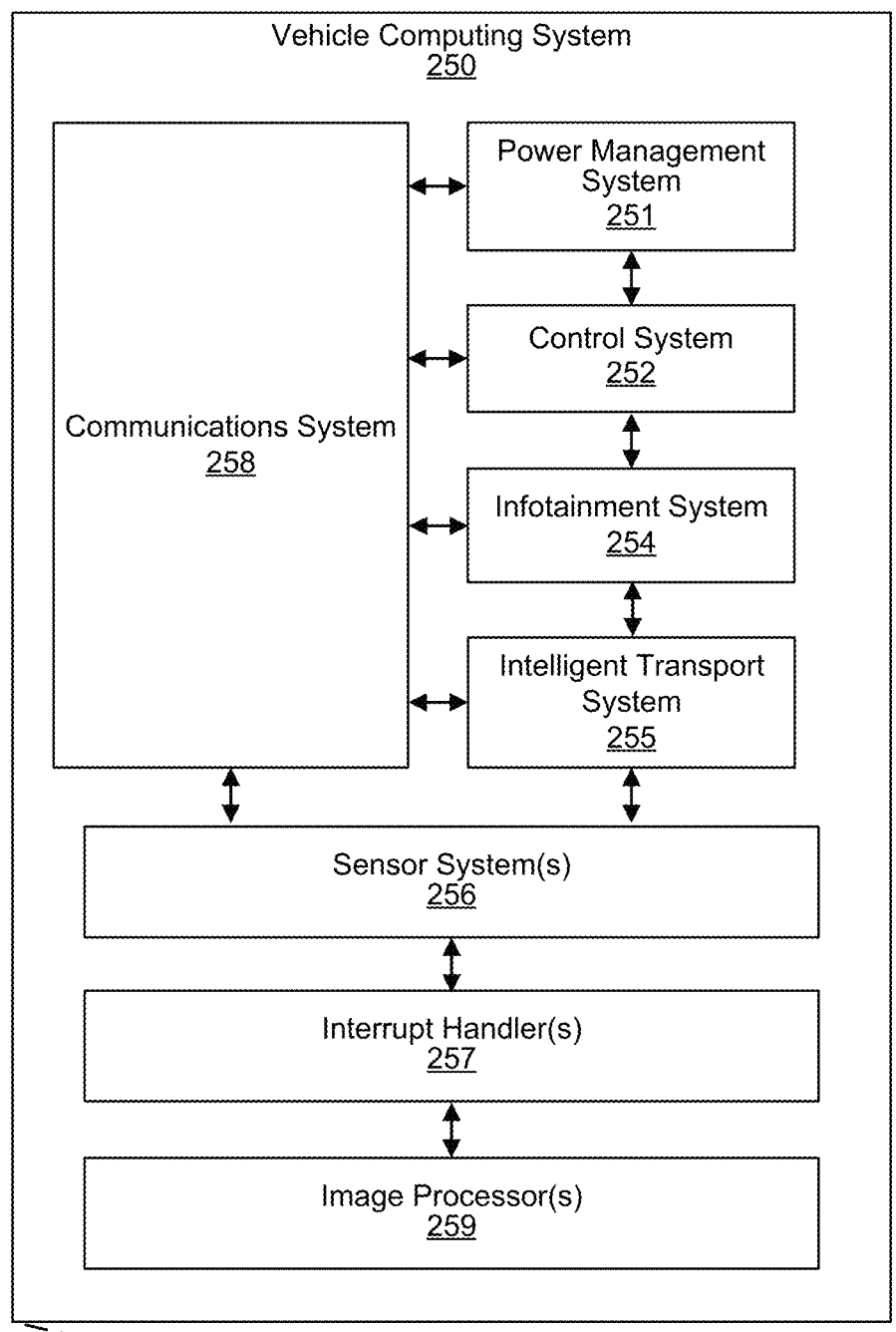
FIG. 2 is a block diagram illustrating an example of vehicle computing system, in accordance with some examples of the present disclosure.
Figure 2:
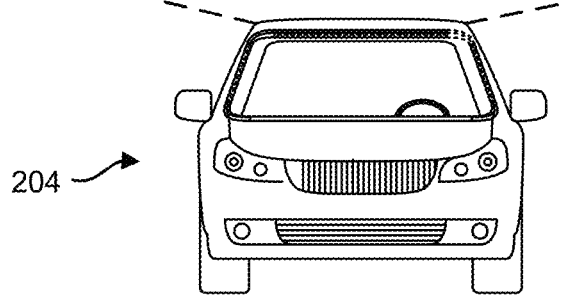

Various aspects of the application will be described with respect to the figures. FIG. 2 is a block diagram illustrating an example a vehicle computing system 250 of a vehicle 204. The vehicle 204 is an example of a user equipment (UE) that can communicate with a network (e.g., an eNodeB, a gNodeB, a positioning beacon, a location measurement unit, and/or other network entity) over a network interface (e.g., a Uu interface) and with other UEs using vehicle to everything (V2X) communications over a device-to-device direct interface. As shown, the vehicle computing system 250 can include at least a power management system 251, a control system 252, an infotainment system 254, an intelligent transport system (ITS) 255, one or more sensor systems 256, and a communications system 258. In some cases, the vehicle computing system 250 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUS), vision processing units (VPUs), Neural Network Signal Processors (NSPs), microcontrollers, dedicated hardware, any combination thereof, and/or other processing device or system.

The control system 252 can be configured to control one or more operations of the vehicle 204, the power management system 251, the computing system 250, the infotainment system 254, the ITS 255, and/or one or more other systems of the vehicle 204 (e.g., a braking system, a steering system, a safety system other than the ITS 255, a cabin system, and/or other system). In some examples, the control system 252 can include one or more electronic control units (ECUs). An ECU can control one or more of the electrical systems or subsystems in a vehicle. Examples of specific ECUs that can be included as part of the control system 252 include an engine control module (ECM), a powertrain control module (PCM), a transmission control module (TCM), a brake control module (BCM), a central control module (CCM), a central timing module (CTM), among others. In some cases, the control system 252 can receive sensor signals from the one or more sensor systems 256 and can communicate with other systems of the vehicle computing system 250 to operate the vehicle 204.

The vehicle computing system 250 also includes a power management system 251. In some implementations, the power management system 251 can include a power management integrated circuit (PMIC), a standby battery, and/or other components. In some cases, other systems of the vehicle computing system 250 can include one or more PMICs, batteries, and/or other components. The power management system 251 can perform power management functions for the vehicle 204, such as managing a power supply for the computing system 250 and/or other parts of the vehicle. For example, the power management system 251 can provide a stable power supply in view of power fluctuations, such as based on starting an engine of the vehicle. In another example, the power management system 251 can perform thermal monitoring operations, such as by checking ambient and/or transistor junction temperatures. In another example, the power management system 251 can perform certain functions based on detecting a certain temperature level, such as causing a cooling system (e.g., one or more fans, an air conditioning system, etc.) to cool certain components of the vehicle computing system 250 (e.g., the control system 252, such as one or more ECUs), shutting down certain functionalities of the vehicle computing system 250 (e.g., limiting the infotainment system 254, such as by shutting off one or more displays, disconnecting from a wireless network, etc.), among other functions.

The vehicle computing system 250 further includes a communications system 258. The communications system 258 can include both software and hardware components for transmitting signals to and receiving signals from a network (e.g., a gNB or other network entity over a Uu interface) and/or from other UEs (e.g., to another vehicle or UE over a PC5 interface, WiFi interface, Bluetooth™ interface, and/or other wireless and/or wired interface). For example, the communications system 258 is configured to transmit and receive information wirelessly over any suitable wireless network (e.g., a 3G network, 4G network, 5G network, WiFi network, Bluetooth™ network, and/or other network). The communications system 258 includes various components or devices used to perform the wireless communication functionalities.

In some cases, the communications system 258 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightning connector, and/or other wired interface) for performing communications over one or more hardwired connections, and/or other components that can allow the vehicle 204 to communicate with a network and/or other UEs.

The vehicle computing system 250 can also include an infotainment system 254 that can control content and one or more output devices of the vehicle 204 that can be used to output the content. The infotainment system 254 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 204), and/or other output device.

In some examples, the vehicle computing system 250 can include the intelligent transport system (ITS) 255. In some examples, the ITS 255 can be used for implementing V2X communications. For example, an ITS stack of the ITS 255 can generate V2X messages based on information from an application layer of the ITS. In some cases, the application layer can determine whether certain conditions have been met for generating messages for use by the ITS 255 and/or for generating messages that are to be sent to other vehicles (for V2V communications), to pedestrian UEs (for V2P communications), and/or to infrastructure systems (for V2I communications). In some cases, the communications system 258 and/or the ITS 255 can obtain car access network (CAN) information (e.g., from other components of the vehicle via a CAN bus). In some examples, the communications system 258 (e.g., a TCU NAD) can obtain the CAN information via the CAN bus and can send the CAN information to the ITS stack. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 255.

The conditions used to determine whether to generate messages can be determined using the CAN information based on safety-related applications and/or other applications, including applications related to road safety, traffic efficiency, infotainment, business, and/or other applications. In one illustrative example, ITS 255 can perform lane change assistance or negotiation. For instance, using the CAN information, the ITS 255 can determine that a driver of the vehicle 204 is attempting to change lanes from a current lane to an adjacent lane (e.g., based on a blinker being activated, based on the user veering or steering into an adjacent lane, etc.). Based on determining the vehicle 204 is attempting to change lanes, the ITS 255 can determine a lane-change condition has been met that is associated with a message to be sent to other vehicles that are nearby the vehicle in the adjacent lane. The ITS 255 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 204, such as based on V2P communications with a UE of the user), traffic sign recognition, among others.

The ITS 255 can use any suitable protocol to generate messages (e.g., V2X messages). Examples of protocols that can be used by the ITS 255 include one or more Society of Automotive Engineering (SAE) standards, such as SAE J2735, SAE J2945, SAE J3161, and/or other standards, which are hereby incorporated by reference in their entirety and for all purposes.

A security layer of the ITS 255 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS stack can be signed by the security layer. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

The computing system 250 further includes one or more sensor systems 256 (e.g., a first sensor system through an Nth sensor system, where N is a value equal to or greater than 0). When including multiple sensor systems, the sensor system(s) 256 can include different types of sensor systems that can be arranged on or in different parts the vehicle 204. The sensor system(s) 256 can include one or more image sensors 259. In one illustrative example, the one or more image sensors 259 can be included in a multiple camera system (e.g., multiple sensor camera configuration 300 of FIG. 3, multiple sensor camera configuration 400 of FIG. 4). In some cases, the vehicle computing system 250 can include interrupt handlers 257 (e.g., interrupt handler 125 of FIG. 1A, programming engine/interrupt handler 160 of FIG. 1B, programming engine/interrupt handler 330 of FIG. 3, first programming engine/interrupt handler 430 and/or second programming engine/interrupt handler 431 of FIG. 4). In some cases, the interrupt handler(s) 257 can be used to manage processing of sensor data from the sensor system(s) 256 in accordance with the systems and techniques described herein.

The sensor system(s) 256 can also include one or more Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 250 of the vehicle 204.

While the vehicle computing system 250 is shown to include certain components and/or systems, one of ordinary skill will appreciate that the vehicle computing system 250 can include more or fewer components than those shown in FIG. 2. For example, the vehicle computing system 250 can also include one or more input devices and one or more output devices (not shown). In some implementations, the vehicle computing system 250 can also include (e.g., as part of or separate from the control system 252, the infotainment system 254, the communications system 258, and/or the sensor system(s) 256) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 3:
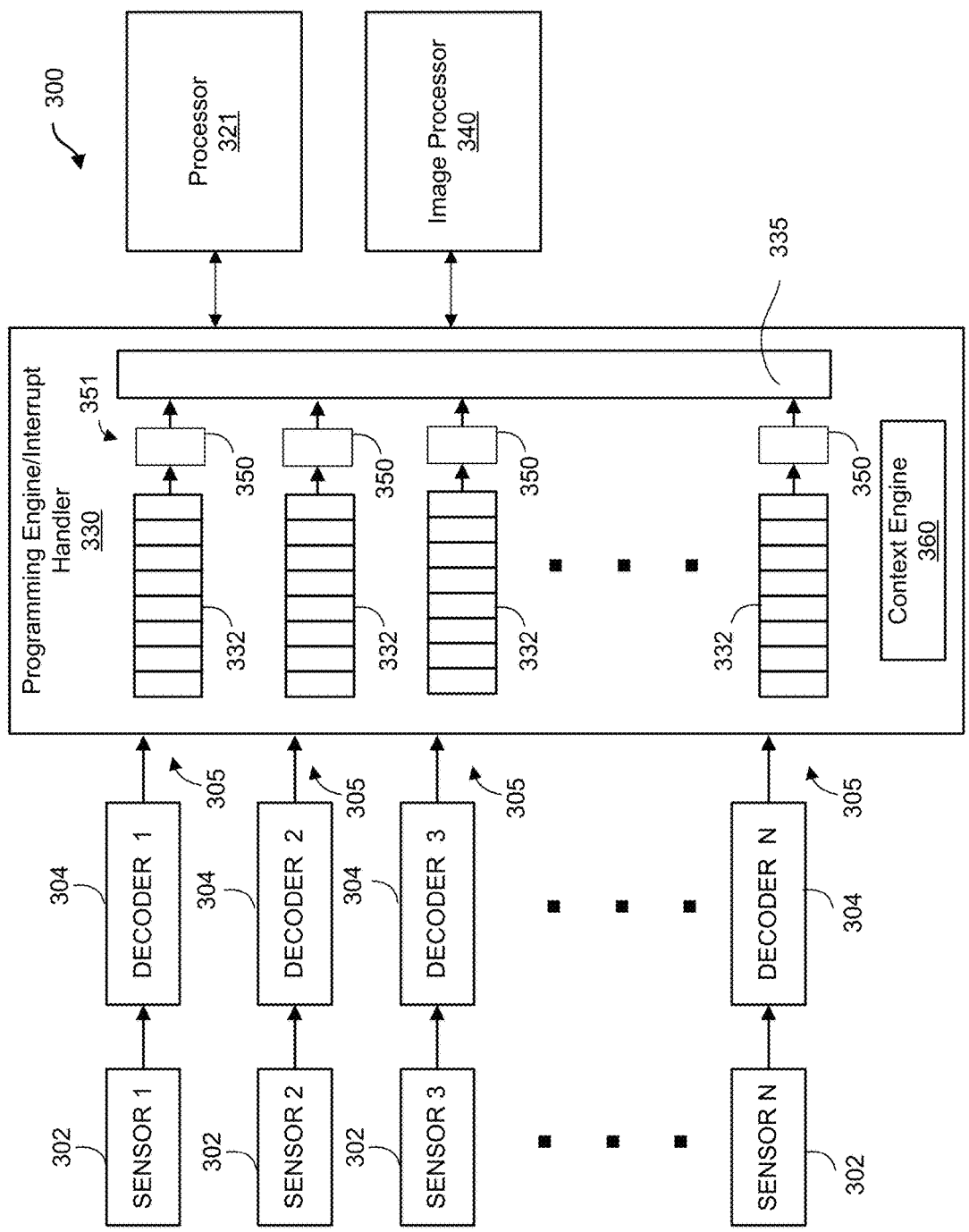
FIG. 3 is a block diagram of an example of an additional multiple sensor camera configuration, in accordance with some examples of the present disclosure.

FIG. 3 is as block diagram illustrated a multiple sensor camera configuration 300 including a HW interrupt handle that can maintain operation of some sensors 102 while other sensors 102 are exhibiting an error. Accordingly, in some cases, the multiple sensor camera configuration 300 FIG. 3 can provide interrupt handling with freedom from interference caused by error handling for one or more sensors 302 exhibiting an error. As illustrated, the multiple sensor camera configuration 300 includes multiple sensors 302, multiple decoders 304, a programming engine/interrupt handler 330, processor 321, and an image processor 340. In the illustrated example of FIG. 3, sensors 302 can be similar to and perform similar functions to sensors 102 of FIG. 1A and FIG. 1B. The image processor 340 can be similar to and perform similar functions to the image processor 140 of FIG. 1A and FIG. 1B. Similarly, decoders 304 can be similar to and perform similar functions to decoders 104 of FIG. 1A and FIG. 1B. As illustrated in FIG. 3, the decoders 304 can provide IRQs 305 to IRQ ports of the programming engine/interrupt handler 330.

Processor 321 can be configured to provide camera configuration data for the sensors 302. In some cases, camera configuration data can include, without limitation, ISO, exposure time, aperture size, f/stop, shutter speed, focus, and/or gain. In some examples, the processor 321 can provide corresponding image processing configuration data to a context buffer 332 of the programming engine/interrupt handler 330. For example, the image processing configuration data can include, without limitation, ISO, exposure time, aperture size, f/stop, shutter speed, focus, gain, and/or adjustments to contrast, brightness, saturation, sharpness, levels, curves, and/or colors. In some cases, the processor 321 can perform other operations, such as any of the operations of the vehicle computing system 250 of FIG. 2.

The programming engine programming engine/interrupt handler 330 includes context buffers 332, programming module 335, multiple interrupt handlers 350 and context engine 360. In the illustrated example, the context buffers 332 can be similar to and perform similar functions to the context buffers 132 of FIG. 1A and FIG. 1B. Similarly, the programming module 335 can be similar to and perform similar functions to the programming module 135 of FIG. 1A and FIG. 1B. As illustrated in FIG. 3, each sensor 302 can be associated with a separate interrupt handler 350 included in the programming engine/interrupt handler 330. For example, if an error occurs on the sensor 302 labeled as SENSOR 1, the corresponding interrupt handler 351 can perform an error handling operation without disrupting operation of the remaining sensors 302. For example, the interrupt handler 351 may signal a non-blocking wait for the corresponding SENSOR 1. In some examples, based on the non-blocking wait, the programming module 335 may skip the sensor 302 in a sequence of providing image processing configuration data from the context buffers 332 to the image processor 340. In some cases, the error handling operation can include resetting and/or reprogramming the sensor 302 that exhibits the error.

In some cases, the interrupt handlers 350 and/or the context engine 360 can flush and/or invalidate data contained within the context buffer 332 corresponding to the sensor 302 exhibiting the error. In some cases, flushing and/or invalidating data contained within the context buffer 332 can prevent erroneous sensor data from being processed by the image processor 340.

Figure 4:
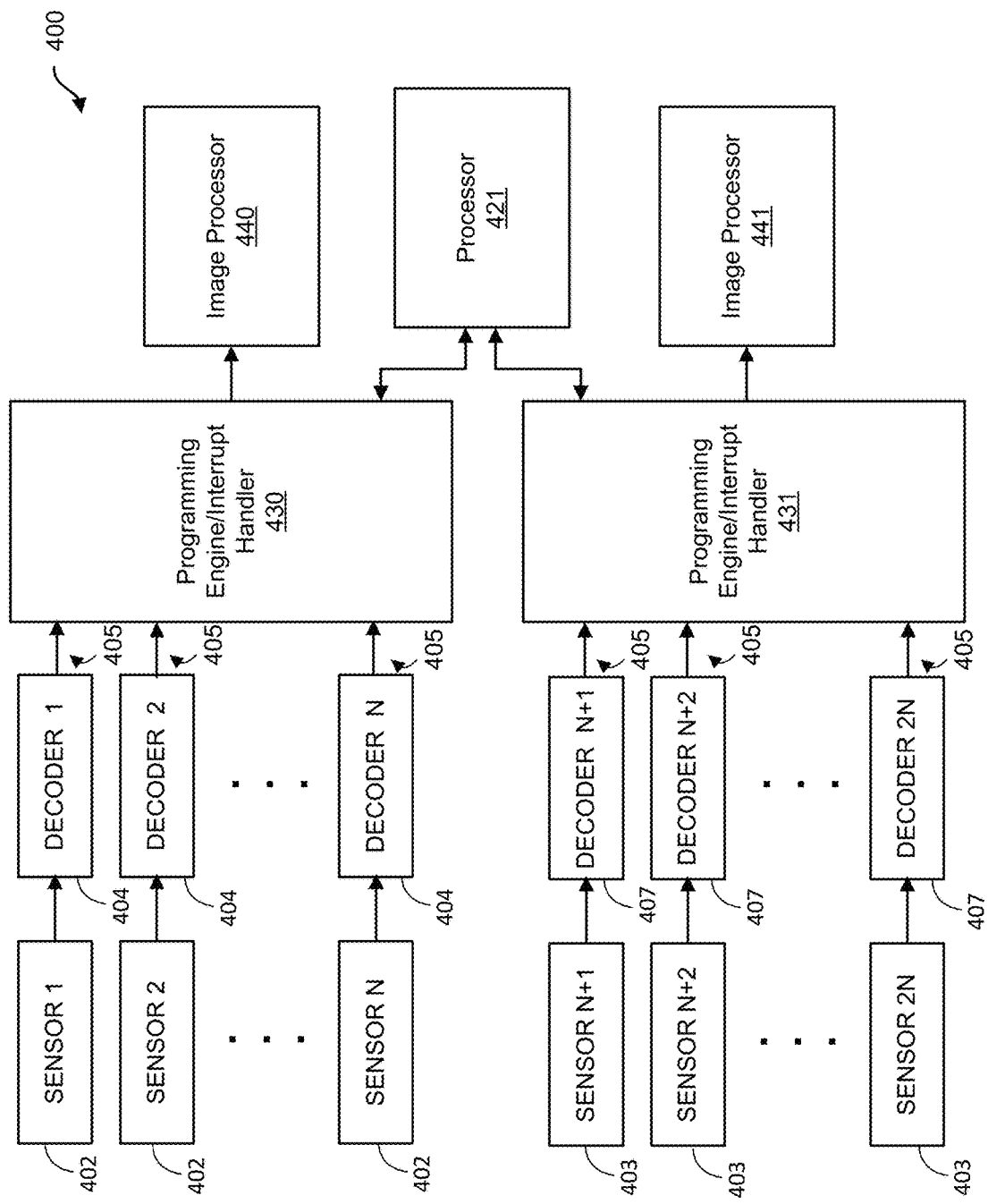
FIG. 4 is a block diagram of a multiple sensor camera configuration including multiple interrupt handlers, in accordance with some examples of the present disclosure.

FIG. 4 illustrates a block diagram of a multiple sensor camera configuration 400 including multiple interrupt handlers. The multiple sensor camera configuration 400 includes a first group of sensors 402, a first group of decoders 404, a second group of sensors 403, a second group of decoders 407, a processor 421, a first programming engine/interrupt handler 430, a second programming engine/interrupt handler 431, a first image processor 440, and a second image processor 441.

Processor 421 can be configured to provide camera configuration data for the first group of sensors 402 and second group of sensors 403. In some cases, camera configuration data can include, without limitation, ISO, exposure time, aperture size, f/stop, shutter speed, focus, and/or gain. In some examples, the processor 421 can provide corresponding image processing configuration data to a context buffer (e.g., context buffers 332 of FIG. 3) of the first programming engine/interrupt handler 430 associated with the first group of sensors 402. Similarly, the processor 421 can provide corresponding image processing configuration data to a context buffer (e.g., context buffers 332 of FIG. 3) of the second programming engine/interrupt handler 431 associated with the second group of sensors 403. For example, the image processing configuration data can include, without limitation, ISO, exposure time, aperture size, f/stop, shutter speed, focus, gain, and/or adjustments to contrast, brightness, saturation, sharpness, levels, curves, and/or colors.

In the illustrated example of FIG. 4, the first programming engine/interrupt handler 430 and the second programming engine/interrupt handler 431 can be similar to and perform similar functions to the programming engine/interrupt handler 330 of FIG. 3. As illustrated, the first programming engine/interrupt handler 430 can obtain IRQs 405 from the first group of sensors 402/first group of decoders 404. The first programming engine/interrupt handler 430 can provide image processing configuration data associated with the first group of sensors 402/first group of decoders 404 to the first image processor 440. Similarly, the second programming engine/interrupt handler 431 can obtain IRQs 405 from the second group of sensors 403/second group of decoders 407 and provide image processing configuration data associated with the second group of sensors 403/second group of decoders 407 to the second image processor 441. In some cases, the processor 421 can perform other operations, such as any of the operations of the vehicle computing system 250 of FIG. 2.

In one illustrative example, the first programming engine/interrupt handler 430 and second programming engine/interrupt handler 431 can each perform interrupt handling for an integer number N of sensors. Accordingly, the multiple sensor camera configuration 400 can provide interrupt handling for 2*N number of sensors. In some cases, additional scaling for additional sensors can be provided by additional programming engine/interrupt handlers and/or image processors. Although the example of FIG. 4 illustrates the first programming engine/interrupt handler 430 and second programming engine/interrupt handler 431 providing interrupt handling for an equal number of sensors, in some cases, two or more interrupt programming engine/interrupt handlers can provide interrupt handling for different numbers of sensors without departing from the scope of the present disclosure.

As noted above, the systems and techniques described herein can be used to provide interrupt handling for sensor systems with large numbers of sensors. The systems and techniques can provide freedom from interference between sensors exhibiting an error and sensors that appear to be operating without errors. In contrast, software based interrupt handlers utilizing general purpose processors (e.g., CPUs) are not well suited to scale with increasing numbers of sensors (e.g., sensors 102 of FIG. 1A). As the number of IRQs (e.g., IRQs 105 of FIG. 1A) increases, the general purpose processor may be unable to respond to IRQs in a timely manner and/or other functions performed by the general purpose processor may be impacted. In some cases, a multiple sensor system including a HW based interrupt handler may fail to provide freedom from interference. For example, in some cases, a HW based interrupt handler may become blocked from handling IRQs of sensors not exhibiting errors.

In contrast, the systems and techniques described herein can provide the benefit of HW based interrupt handling offloading from the general purpose processor while simultaneously providing freedom from interference. In some cases, a separate interrupt handler can be provided for each of the sensors of the multiple sensors. When a sensor exhibits an error, the corresponding interrupt handler can perform an error handling operation. For example, the interrupt handler can apply a non-blocking wait to a programming module (e.g., programming module 335 of FIG. 3). In some cases, the interrupt handler can flush and/or invalidate the data of the context buffer 332 corresponding to the sensor exhibiting the error. In some cases, the systems and techniques described herein can be scaled with increasing numbers of sensors by providing multiple HW based interrupt handlers operating in parallel.

Figure 5:
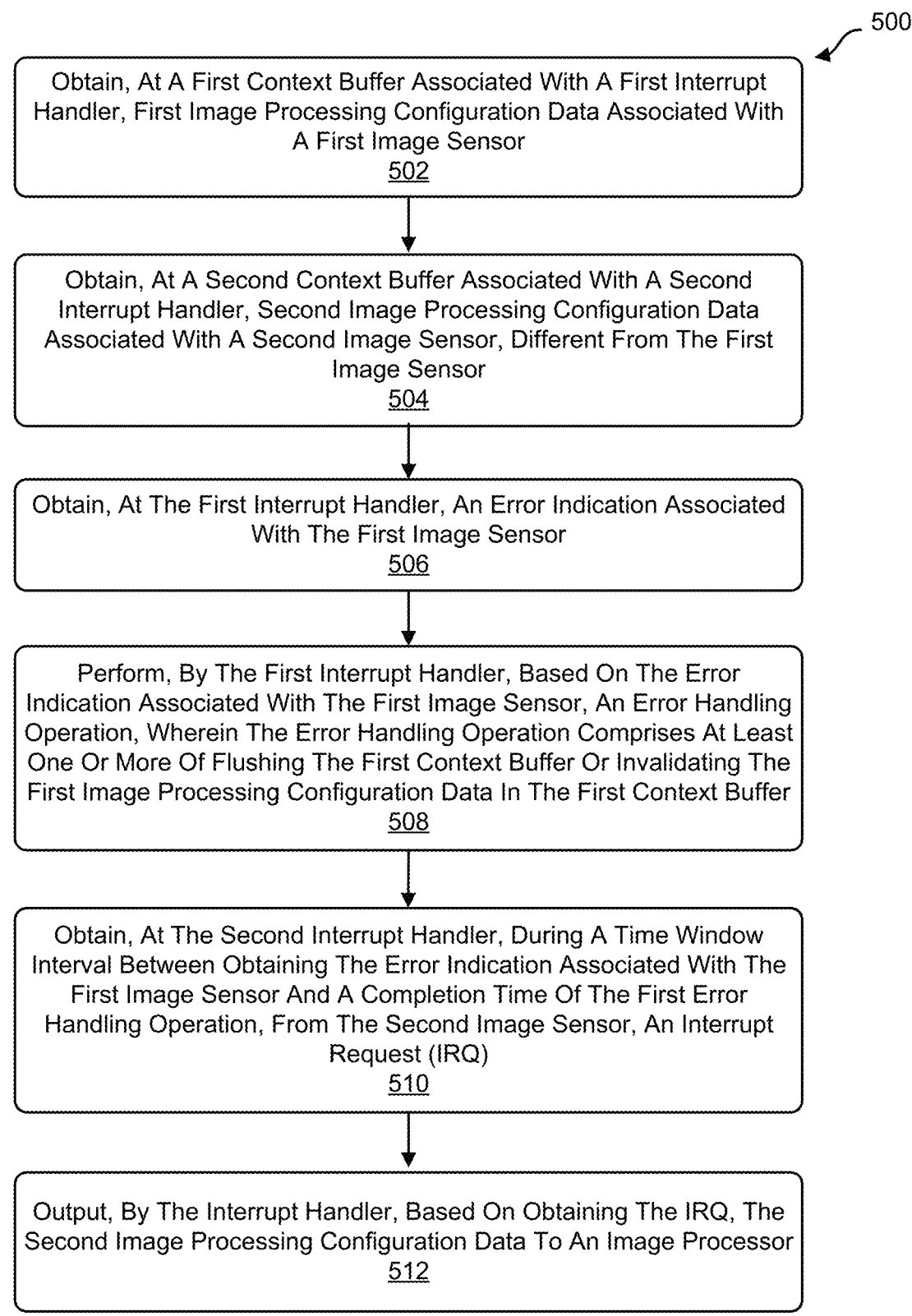
FIG. 5 is a flow diagram illustrating an example of a process for processing one or more frames, in accordance with some examples of the present disclosure.

FIG. 5 is a flow diagram illustrating an example of a process 500 for interrupt handling. At block 502, the process 500 includes obtaining, at a first context buffer (e.g., context buffers 332 of FIG. 3) associated with a first interrupt handler (e.g., interrupt handlers 350 of FIG. 3), first image processing configuration data associated with a first image sensor (e.g., sensors 102 of FIG. 1, sensor 302 of FIG. 3). In some cases, the first image processing configuration data includes at least one of an exposure setting, a gain, a resolution, a pixel configuration, a motion indication, or a dynamic range setting. In some examples, the first context buffer and the second context buffer are first-in-first-out (FIFO) buffers.

At block 504, the process 500 includes obtaining, at a second context buffer (e.g., context buffers 332 of FIG. 3) associated with a second interrupt handler (e.g., interrupt handlers 350 of FIG. 3), second image processing configuration data associated with a second image sensor (e.g., sensors 102 of FIG. 1, sensor 302 of FIG. 3), different from the first image sensor.

At block 506, the process 500 includes obtaining, at the first interrupt handler, an error indication associated with the first image sensor.

At block 508, the process 500 includes performing, by the first interrupt handler, based on the error indication associated with the first image sensor, an error handling operation. In some examples, the error handling operation includes at least one of flushing the first context buffer or invalidating the first image processing configuration data in the first context buffer. In some examples, the error handling operation comprises resetting the first image sensor. In some cases, the error handling operation includes a non-blocking wait associated with at least one of the second image sensor or the second context buffer. In some examples, during the non-blocking wait, the second image sensor remains operational while at least one of the first image sensor or the first context buffer associated with the first interrupt handler is inoperative.

At block 510, the process 500 includes obtaining, at the second interrupt handler, during a time window interval between obtaining the error indication associated with the first image sensor and a completion time of the first error handling operation, from the second image sensor, an IRQ. In some aspects, the IRQ corresponds to completion of an image capture operation by the second image sensor, wherein the image capture operation includes storing an image in a memory.

At block 512, the process 500 includes outputting, by the interrupt handler, based on obtaining the IRQ, the second image processing configuration data to an image processor.

In some cases, the process 500 includes obtaining, at an image processor, the second image processing configuration data and processing, based on the second image processing configuration data, an image associated with the second image processing configuration data.

In some cases, the process 500 includes obtaining, at a third context buffer (e.g., context buffers 332 of FIG. 3) associated with a third interrupt handler (e.g., interrupt handlers 350 of FIG. 3), third image processing configuration data associated with a third image sensor (e.g., sensors 102 of FIG. 1, sensor 302 of FIG. 3). In some examples, the process 500 includes obtaining, by the third interrupt handler, an additional IRQ from the third image sensor. In some implementations, the process 500 includes obtaining, from the image processor, an indication that processing the image associated with the second image processing configuration data is complete. In some aspects, the process 500 includes outputting, by the third interrupt handler, based on obtaining the additional IRQ, the third image processing configuration data to the image processor.

In some examples, a plurality of image sensors comprises the first image sensor and the second image sensor. In some cases, a plurality of interrupt handlers comprises the first interrupt handler and the second interrupt handler. In some implementations, interrupt handlers of the plurality of interrupt handlers are configured to handle IRQs from the plurality of image sensors in a round-robin order.

In some examples, a plurality of image sensors comprises the first image sensor and the second image sensor. In some cases, a plurality of interrupt handlers comprises the first interrupt handler and the second interrupt handler. In some implementations, the interrupt handlers of the plurality of interrupt handlers are configured to handle IRQs from the plurality of image sensors in a priority order. In some aspects, a high priority grouping comprises at least one image sensor of the plurality of image sensors and a low priority grouping comprises a different at least one image sensor of the plurality of image sensors.

In some examples, the processes described herein (e.g., process 500 and/or other process described herein) may be performed by a computing device or apparatus. In one example, one or more of the processes can be performed by the vehicle computing system 250 of FIG. 2. In another example, one or more of the processes can be performed by the computing system 800 shown in FIG. 8. For instance, a computing device with the computing system 800 shown in FIG. 8 can include the components of the vehicle computing system 250 and can implement the operations of the process 500 of FIG. 5 and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 500 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
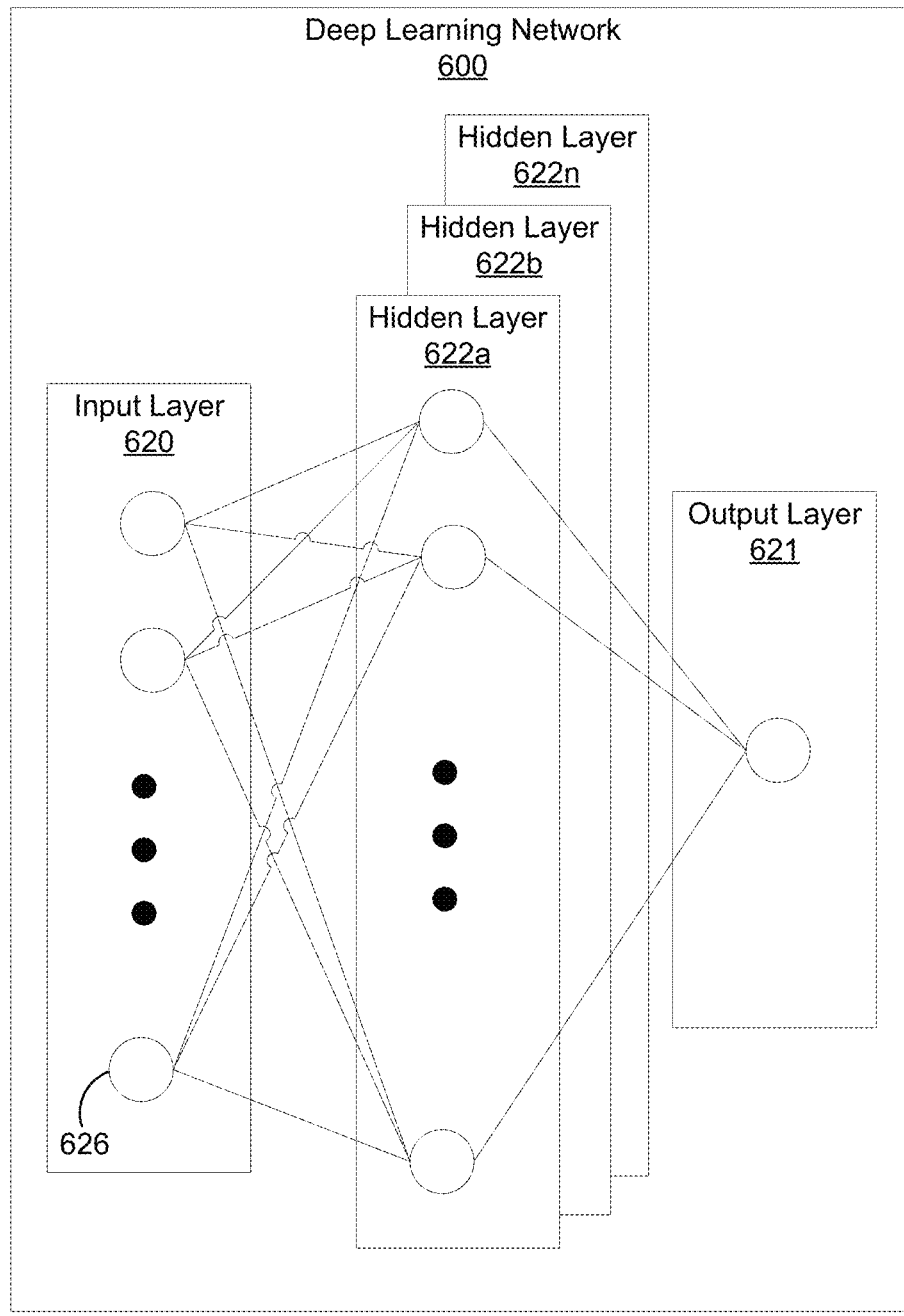
FIG. 6 is a block diagram illustrating an example of a deep learning network, in accordance with some examples of the present disclosure.

As noted above, various aspects of the present disclosure can use machine learning models or systems. FIG. 6 is an illustrative example of a deep learning neural network 600 that can be used to implement the machine learning based feature extraction and/or activity recognition (or classification) described above. An input layer 620 includes input data. In one illustrative example, the input layer 620 can include data representing the pixels of an input video frame. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n. In one illustrative example, the output layer 621 can provide a classification for an object in an input video frame. The classification can include a class identifying the type of activity (e.g., looking up, looking down, closing eyes, yawning, etc.).

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes (e.g., node 626) in the neural network 600 are shown as having multiple output lines, a node has a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621. In an example in which the neural network 600 is used to identify activities being performed by a driver in frames, the neural network 600 can be trained using training data that includes both frames and labels, as described above. For instance, training frames can be input into the network, with each training frame having a label indicating the features in the frames or a label indicating classes of an activity in each frame. In one example using object classification for illustrative purposes, a training frame can include an image of a number 2, in which case the label for the image can be [0 0 1 0 0 0 0 0 0 0].

In some cases, the neural network 600 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 600 is trained well enough so that the weights of the layers are accurately tuned.

For the example of identifying objects in frames, the forward pass can include passing a training frame through the neural network 600. The weights are initially randomized before the neural network 600 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for the neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 600 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $$E_{total} = \sum \frac{1}{2}(\text{target} - \text{output})^2$$

The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 600 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, a deep belief nets (DBNs), a Recurrent Neural Networks (RNNs), among others.

Figure 7:
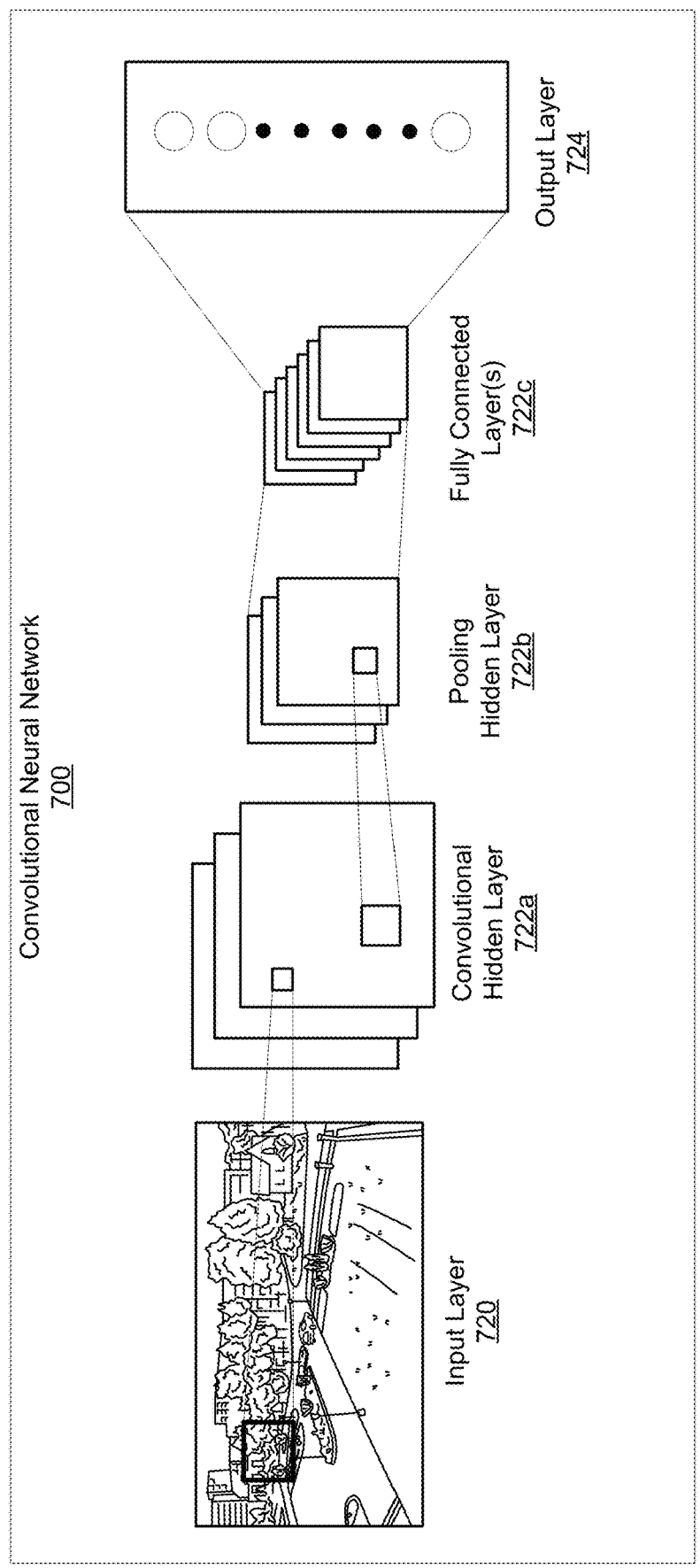
FIG. 7 is a block diagram illustrating an example of a convolutional neural network, in accordance with some examples of the present disclosure.

FIG. 7 is an illustrative example of a convolutional neural network (CNN) 700. The input layer 720 of the CNN 700 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 722a, an optional non-linear activation layer, a pooling hidden layer 722b, and fully connected hidden layers 722c to get an output at the output layer 724. While only one of each hidden layer is shown in FIG. 7, one of ordinary skill will appreciate that multiple convolutional hidden layers, non-linear layers, pooling hidden layers, and/or fully connected layers can be included in the CNN 700. As previously described, the output can indicate a single class of an object or can include a probability of classes that best describe the object in the image.

The first layer of the CNN 700 is the convolutional hidden layer 722a. The convolutional hidden layer 722a analyzes the image data of the input layer 720. Each node of the convolutional hidden layer 722a is connected to a region of nodes (pixels) of the input image called a receptive field. The convolutional hidden layer 722a can be considered as one or more filters (each filter corresponding to a different activation or feature map), with each convolutional iteration of a filter being a node or neuron of the convolutional hidden layer 722a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 722a. Each connection between a node and a receptive field for that node learns a weight and, in some cases, an overall bias such that each node learns to analyze its particular local receptive field in the input image. Each node of the hidden layer 722a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 722a is due to each node of the convolutional layer being applied to its corresponding receptive field. For example, a filter of the convolutional hidden layer 722a can begin in the top-left corner of the input image array and can convolve around the input image. As noted above, each convolutional iteration of the filter can be considered a node or neuron of the convolutional hidden layer 722a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 722a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 722a.

The mapping from the input layer to the convolutional hidden layer 722a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 722a can include several activation maps in order to identify multiple features in an image. The example shown in FIG. 7 includes three activation maps. Using three activation maps, the convolutional hidden layer 722a can detect three different kinds of features, with each feature being detectable across the entire image.

In some examples, a non-linear hidden layer can be applied after the convolutional hidden layer 722a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 700 without affecting the receptive fields of the convolutional hidden layer 722a.

The pooling hidden layer 722b can be applied after the convolutional hidden layer 722a (and after the non-linear hidden layer when used). The pooling hidden layer 722b is used to simplify the information in the output from the convolutional hidden layer 722a. For example, the pooling hidden layer 722b can take each activation map output from the convolutional hidden layer 722a and generates a condensed activation map (or feature map) using a pooling function. Max-pooling is one example of a function performed by a pooling hidden layer. Other forms of pooling functions be used by the pooling hidden layer 722a, such as average pooling. L2-norm pooling, or other suitable pooling functions. A pooling function (e.g., a max-pooling filter, an L2-norm filter, or other suitable pooling filter) is applied to each activation map included in the convolutional hidden layer 722a. In the example shown in FIG. 7, three pooling filters are used for the three activation maps in the convolutional hidden layer 722a.

In some examples, max-pooling can be used by applying a max-pooling filter (e.g., having a size of 2×2) with a stride (e.g., equal to a dimension of the filter, such as a stride of 2) to an activation map output from the convolutional hidden layer 722a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 722a having a dimension of 24×24 nodes, the output from the pooling hidden layer 722b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 700.

The final layer of connections in the network is a fully-connected layer that connects every node from the pooling hidden layer 722b to every one of the output nodes in the output layer 724. Using the example above, the input layer includes 28×28 nodes encoding the pixel intensities of the input image, the convolutional hidden layer 722a includes 3×24×24 hidden feature nodes based on application of a 5×5 local receptive field (for the filters) to three activation maps, and the pooling hidden layer 722b includes a layer of 3×12×12 hidden feature nodes based on application of max-pooling filter to 2×2 regions across each of the three feature maps. Extending this example, the output layer 724 can include ten output nodes. In such an example, every node of the 3×12×12 pooling hidden layer 722b is connected to every node of the output layer 724.

The fully connected layer 722c can obtain the output of the previous pooling hidden layer 722b (which should represent the activation maps of high-level features) and determines the features that most correlate to a particular class. For example, the fully connected layer 722c layer can determine the high-level features that most strongly correlate to a particular class, and can include weights (nodes) for the high-level features. A product can be computed between the weights of the fully connected layer 722c and the pooling hidden layer 722b to obtain probabilities for the different classes. For example, if the CNN 700 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 724 can include an M-dimensional vector (in the prior example, M=10). M indicates the number of classes that the CNN 700 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. A method for interrupt handling comprising: obtaining, at a first context buffer associated with a first interrupt handler, first image processing configuration data associated with a first image sensor; obtaining, at a second context buffer associated with a second interrupt handler, second image processing configuration data associated with a second image sensor, different from the first image sensor; obtaining, at the first interrupt handler, an error indication associated with the first image sensor; performing, by the first interrupt handler, based on the error indication associated with the first image sensor, an error handling operation, wherein the error handling operation comprises at least one of flushing the first context buffer or invalidating the first image processing configuration data in the first context buffer; obtaining, at the second interrupt handler, during a time window interval between obtaining the error indication associated with the first image sensor and a completion time of the error handling operation, from the second image sensor, an interrupt request (IRQ); and outputting, based on obtaining the IRQ, the second image processing configuration data to an image processor.

Aspect 2. The method for interrupt handling of Aspect 1, wherein the IRQ corresponds to completion of an image capture operation by the second image sensor.

Aspect 3. The method for interrupt handling of Aspect 2, wherein the image capture operation comprises storing an image in a memory.

Aspect 4. The method for interrupt handling of any one of Aspects 1 to 3, further comprising: obtaining, at an image processor, the second image processing configuration data; and processing, based on the second image processing configuration data, an image associated with the second image processing configuration data.

Aspect 5. The method for interrupt handling of Aspect 4, further comprising: obtaining, at a third context buffer associated with a third interrupt handler, third image processing configuration data associated with a third image sensor; obtaining, by the third interrupt handler, an additional IRQ from the third image sensor; obtaining, from the image processor, an indication that processing the image associated with the second image processing configuration data is complete; and outputting, by the third interrupt handler, based on obtaining the additional IRQ, the third image processing configuration data to the image processor.

Aspect 6. The method for interrupt handling of any one of Aspects 1 to 5, wherein a plurality of image sensors comprises the first image sensor and the second image sensor, and wherein a plurality of interrupt handlers comprises the first interrupt handler and the second interrupt handler, wherein interrupt handlers of the plurality of interrupt handlers are configured to handle IRQs from the plurality of image sensors in a round-robin order.

Aspect 7. The method for interrupt handling of any one of Aspects 1 to 6, wherein a plurality of image sensors comprises the first image sensor and the second image sensor, and wherein a plurality of interrupt handlers comprises the first interrupt handler and the second interrupt handler, and wherein interrupt handlers of the plurality of interrupt handlers are configured to handle IRQs from the plurality of image sensors in a priority order, wherein a high priority grouping comprises at least one image sensor of the plurality of image sensors and a low priority grouping comprises a different at least one image sensor of the plurality of image sensors.

Aspect 8. The method for interrupt handling of any one of Aspects 1 to 7, wherein the first image processing configuration data comprises at least one of an exposure setting, a gain, a resolution, a pixel configuration, a motion indication, or a dynamic range setting.

Aspect 9. The method for interrupt handling of any one of Aspects 1 to 8, wherein the first context buffer and the second context buffer are first-in-first-out (FIFO) buffers.

Aspect 10. The method for interrupt handling of any one of Aspects 1 to 9, wherein the error handling operation comprises resetting the first image sensor.

Aspect 11. The method for interrupt handling of any one of Aspects 1 to 10, wherein the error handling operation comprises a non-blocking wait associated with at least one of the second image sensor or the second context buffer.

Aspect 12. The method of interrupt handling of Aspect 11, wherein, during the non-blocking wait, the second image sensor remains operational while at least one of the first image sensor or the first context buffer associated with the first interrupt handler is inoperative.

Aspect 13. An apparatus for interrupt handling, the apparatus comprising: a first interrupt handler configured to obtain an error indication associated with a first image sensor; a first context buffer associated with the first interrupt handler and configured to obtain first image processing configuration data associated with the first image sensor; a second interrupt handler; and a second context buffer associated with the second interrupt handler and configured to obtain second image processing configuration data associated with a second image sensor, different from the first image sensor; wherein the first interrupt handler is further configured to perform, based on the error indication associated with the first image sensor, an error handling operation, wherein the error handling operation comprises at least one of flushing the first context buffer or invalidating the first image processing configuration data in the first context buffer; and wherein the second interrupt handler is configured to obtain, during a time window interval between obtaining the error indication associated with the first image sensor and a completion time of the error handling operation, from the second image sensor, an interrupt request (IRQ); and wherein the second context buffer is configured to output, based on obtaining the IRQ, the second image processing configuration data to an image processor.

Aspect 14. The apparatus of Aspect 13, wherein the IRQ corresponds to completion of an image capture operation by the second image sensor.

Aspect 15. The apparatus of Aspect 14, wherein the image capture operation comprises storing an image in a memory.

Aspect 16. The apparatus of any one of Aspects 13 to 15, further comprising an image processor configured to: obtain the second image processing configuration data; and process, based on the second image processing configuration data, an image associated with the second image processing configuration data.

Aspect 17. The apparatus of Aspect 16, further comprising: a third context buffer associated with a third interrupt handler and configured to obtain third image processing configuration data associated with a third image sensor; and the third interrupt handler, wherein the third interrupt handler is configured to: obtain an additional IRQ from the third image sensor; obtain, from the image processor, an indication that processing the image associated with the second image processing configuration data is complete; and output, based on obtaining the additional IRQ, the third image processing configuration data to the image processor.

Aspect 18. The apparatus of any one of Aspects 13 to 17, wherein a plurality of image sensors comprises the first image sensor and the second image sensor, and wherein a plurality of interrupt handlers comprises the first interrupt handler and the second interrupt handler, wherein interrupt handlers of the plurality of interrupt handlers are configured to handle IRQs from the plurality of image sensors in a round-robin order.

Aspect 19. The apparatus of any one of Aspects 13 to 18, wherein a plurality of image sensors comprises the first image sensor and the second image sensor, and wherein a plurality of interrupt handlers comprises the first interrupt handler and the second interrupt handler, and wherein interrupt handlers of the plurality of interrupt handlers are configured to handle IRQs from the plurality of image sensors in a priority order, wherein a high priority grouping comprises at least one image sensor of the plurality of image sensors and a low priority grouping comprises a different at least one image sensor of the plurality of image sensors.

Aspect 20. The apparatus of any one of Aspects 13 to 19, wherein the first image processing configuration data comprises at least one of an exposure setting, a gain, a resolution, a pixel configuration, a motion indication, or a dynamic range setting.

Aspect 21. The apparatus of any one of Aspects 13 to 20, wherein the first context buffer and the second context buffer are first-in-first-out (FIFO) buffers.

Aspect 22. The apparatus of any one of Aspects 13 to 21, wherein the error handling operation comprises resetting the first image sensor.

Aspect 23. The apparatus of any one of Aspects 13 to 22, wherein the error handling operation comprises a non-blocking wait associated with at least one of the second image sensor or the second context buffer.

Aspect 24. The apparatus of any one of Aspects 13 to 23, wherein, during the non-blocking wait, the second image sensor remains operational while at least one of the first image sensor or the first context buffer associated with the first interrupt handler is inoperative.

Aspect 25. A non-transitory computer-readable medium having stored thereon instructions that, when executed by at least one processor, cause the at least one processor to perform operations according to any of Aspects 1 to 12.

Aspect 26. An apparatus for interrupt handling, comprising one or more means for performing operations according to any of Aspects 1 to 12.

What is claimed is:

1. A method for interrupt handling comprising:
    obtaining, at a first context buffer associated with a first interrupt handler, first image processing configuration data associated with a first image sensor;
    obtaining, at a second context buffer associated with a second interrupt handler, second image processing configuration data associated with a second image sensor, different from the first image sensor;
    obtaining, at the first interrupt handler, an error indication associated with the first image sensor;
    performing, by the first interrupt handler, based on the error indication associated with the first image sensor, an error handling operation, wherein the error handling operation comprises at least one of flushing the first context buffer or invalidating the first image processing configuration data in the first context buffer;
    obtaining, at the second interrupt handler, during a time window interval between obtaining the error indication associated with the first image sensor and a completion time of the error handling operation, from the second image sensor, an interrupt request (IRQ); and
    outputting, based on obtaining the IRQ, the second image processing configuration data to an image processor.

2. The method for interrupt handling of claim 1, wherein the IRQ corresponds to completion of an image capture operation by the second image sensor.

3. The method for interrupt handling of claim 2, wherein the image capture operation comprises storing an image in a memory.

4. The method for interrupt handling of claim 1, further comprising:
    obtaining, at an image processor, the second image processing configuration data; and
    processing, based on the second image processing configuration data, an image associated with the second image processing configuration data.

5. The method for interrupt handling of claim 4, further comprising:
    obtaining, at a third context buffer associated with a third interrupt handler, third image processing configuration data associated with a third image sensor;
    obtaining, by the third interrupt handler, an additional IRQ from the third image sensor;
    obtaining, from the image processor, an indication that processing the image associated with the second image processing configuration data is complete; and
    outputting, by the third interrupt handler, based on obtaining the additional IRQ, the third image processing configuration data to the image processor.

6. The method for interrupt handling of claim 1, wherein a plurality of image sensors comprises the first image sensor and the second image sensor, and wherein a plurality of interrupt handlers comprises the first interrupt handler and the second interrupt handler, wherein interrupt handlers of the plurality of interrupt handlers are configured to handle IRQs from the plurality of image sensors in a round-robin order.

7. The method for interrupt handling of claim 1, wherein a plurality of image sensors comprises the first image sensor and the second image sensor, and wherein a plurality of interrupt handlers comprises the first interrupt handler and the second interrupt handler, and wherein interrupt handlers of the plurality of interrupt handlers are configured to handle IRQs from the plurality of image sensors in a priority order, wherein a high priority grouping comprises at least one image sensor of the plurality of image sensors and a low priority grouping comprises a different at least one image sensor of the plurality of image sensors.

8. The method for interrupt handling of claim 1, wherein the first image processing configuration data comprises at least one of an exposure setting, a gain, a resolution, a pixel configuration, a motion indication, or a dynamic range setting.

9. The method for interrupt handling of claim 1, wherein the first context buffer and the second context buffer are first-in-first-out (FIFO) buffers.

10. The method for interrupt handling of claim 1, wherein the error handling operation comprises resetting the first image sensor.

11. The method for interrupt handling of claim 1, wherein the error handling operation comprises a non-blocking wait associated with at least one of the second image sensor or the second context buffer.

12. The method of interrupt handling of claim 11, wherein, during the non-blocking wait, the second image sensor remains operational while at least one of the first image sensor or the first context buffer associated with the first interrupt handler is inoperative.

13. An apparatus for interrupt handling, the apparatus comprising:
   a first interrupt handler configured to obtain an error indication associated with a first image sensor;
   a first context buffer associated with the first interrupt handler and configured to obtain first image processing configuration data associated with the first image sensor;
   a second interrupt handler; and
   a second context buffer associated with the second interrupt handler and configured to obtain second image processing configuration data associated with a second image sensor, different from the first image sensor;
   wherein the first interrupt handler is further configured to perform, based on obtaining the error indication associated with the first image sensor, an error handling operation, wherein the error handling operation comprises at least one of flushing the first context buffer or invalidating the first image processing configuration data in the first context buffer; and
   wherein the second interrupt handler is configured to obtain, during a time window interval between obtaining the error indication associated with the first image sensor and a completion time of the error handling operation, from the second image sensor, an interrupt request (IRQ); and
   wherein the second context buffer is configured to output, based on obtaining the IRQ, the second image processing configuration data to an image processor.

14. The apparatus of claim 13, wherein the IRQ corresponds to completion of an image capture operation by the second image sensor.

15. The apparatus of claim 14, wherein the image capture operation comprises storing an image in a memory.

16. The apparatus of claim 13, further comprising an image processor configured to:
   obtain the second image processing configuration data; and
   process, based on the second image processing configuration data, an image associated with the second image processing configuration data.

17. The apparatus of claim 16, further comprising:
   a third context buffer associated with a third interrupt handler and configured to obtain third image processing configuration data associated with a third image sensor; and
   the third interrupt handler, wherein the third interrupt handler is configured to:
      obtain an additional IRQ from the third image sensor;
      obtain, from the image processor, an indication that processing the image associated with the second image processing configuration data is complete; and
      output, based on obtaining the additional IRQ, the third image processing configuration data to the image processor.

18. The apparatus of claim 13, wherein a plurality of image sensors comprises the first image sensor and the second image sensor, and wherein a plurality of interrupt handlers comprises the first interrupt handler and the second interrupt handler, wherein interrupt handlers of the plurality of interrupt handlers are configured to handle IRQs from the plurality of image sensors in a round-robin order.

19. The apparatus of claim 13, wherein a plurality of image sensors comprises the first image sensor and the second image sensor, and wherein a plurality of interrupt handlers comprises the first interrupt handler and the second interrupt handler, and wherein interrupt handlers of the plurality of interrupt handlers are configured to handle IRQs from the plurality of image sensors in a priority order, wherein a high priority grouping comprises at least one image sensor of the plurality of image sensors and a low priority grouping comprises a different at least one image sensor of the plurality of image sensors.

20. The apparatus of claim 13, wherein the first image processing configuration data comprises at least one of an exposure setting, a gain, a resolution, a pixel configuration, a motion indication, or a dynamic range setting.

21. The apparatus of claim 13, wherein the first context buffer and the second context buffer are first-in-first-out (FIFO) buffers.

22. The apparatus of claim 13, wherein the error handling operation comprises resetting the first image sensor.

23. The apparatus of claim 13, wherein the error handling operation comprises a non-blocking wait associated with at least one of the second image sensor or the second context buffer.

24. The apparatus of claim 23, wherein, during the non-blocking wait, the second image sensor remains operational while at least one of the first image sensor or the first context buffer associated with the first interrupt handler is inoperative.

* * * * *